May 20, 1969    W. K. FRENCH ET AL    3,444,914
CREDIT CARD CARRIER
Filed Nov. 9, 1967
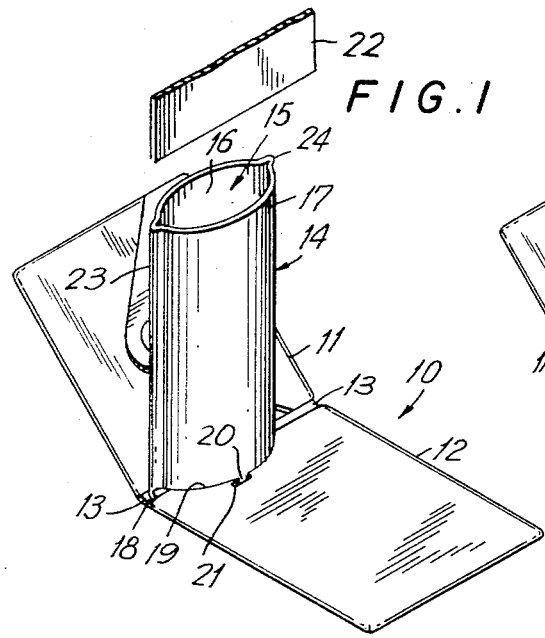
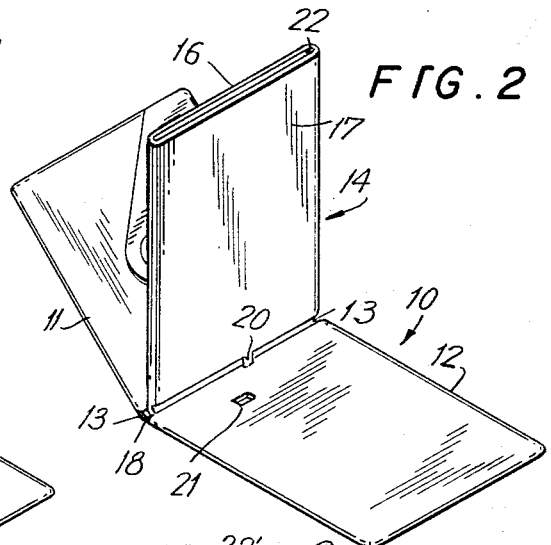
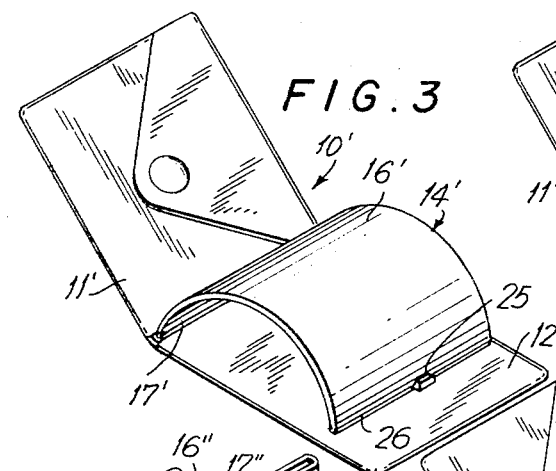
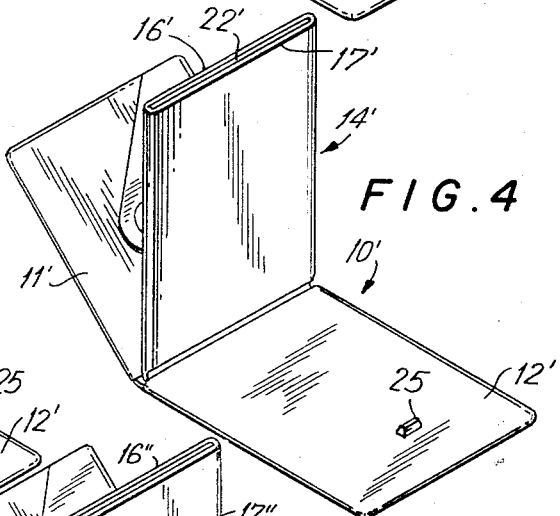
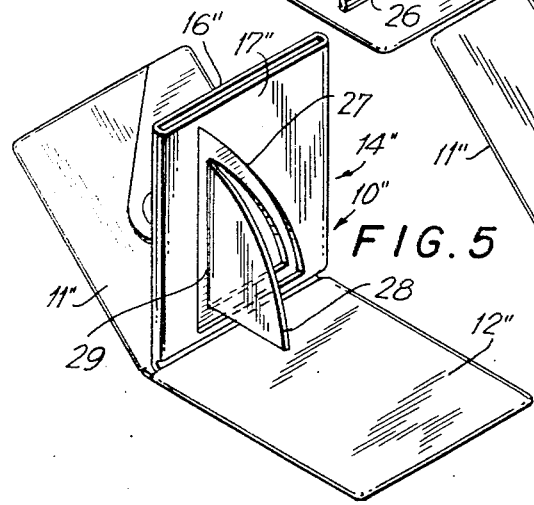
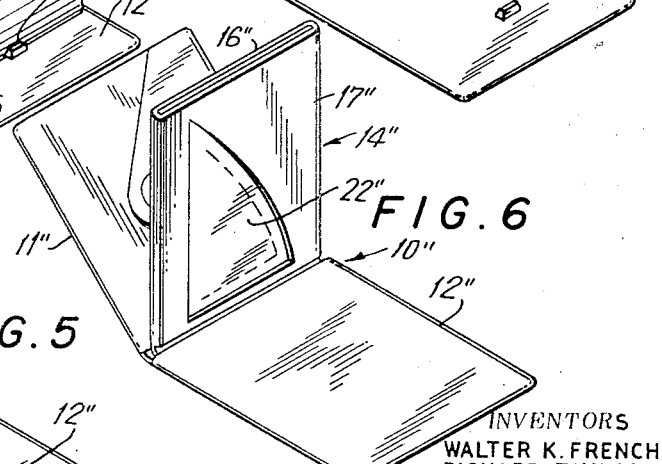
INVENTORS
WALTER K. FRENCH
RICHARD TAYLOR
BY *Mark Burruchu*
ATTORNEY United States Patent Office 3,444,914
Patented May 20, 1969

3,444,914
CREDIT CARD CARRIER
Walter K. French, Montrose, and Richard Taylor, Yorktown Heights, N.Y., assignors of twenty percent each to George M. Jaffin, Scarsdale, and Mark T. Basseches, Pleasantville, N.Y.
Filed Nov. 9, 1967, Ser. No. 681,708
Int. Cl. A45c 11/18
U.S. Cl. 150—39                              6 Claims

ABSTRACT OF THE DISCLOSURE

A credit card carrier including mechanism for reminding the owner to reinsert credit cards, characterized by providing a container which is three dimensional and which is rendered two dimensional, and hence compact, when the credit card is inserted therein.

BACKGROUND OF THE INVENTION

Field of the invention

This invention is in the field of containers and particularly wallets or like containers for credit cards.

Description of the prior art

As is well known, a considerable number of transactions are currently conducted through the use of so-called credit cards comprising rigid plastic or metallic plates or sheets embossed with certain information bearing areas. The plates or sheets serve to imprint information regarding the owner of the card on specially prepared paper forms which identify the billing address or other information with respect to the card holder. In all or substantially all cases, the card is issued with the condition that all merchandise, services or the like charged through the use of the card will be billed to the card holder, regardless of whether or not the use of the card is authorized, until the charge plate issuing organization is formally advised that the card is not to be honored thereafter.

From the foregoing it will be evident that should a card fall into the hands of unscrupulous persons, it is possible for such persons to charge articles and services and render the card holder liable therefor, until such time as the card holder apprises the issuing organization that the card has been lost or misappropriated.

In normal use, the card owner carries one or more credit cards in a holder forming a compartment of a wallet or the like. When the card is to be presented, the owner will open his wallet and remove the card for processing by the vendor. In many instances, the vendor may neglect to return the card and, through oversight, the card holder may leave the card with the vendor.

Under the best of circumstances, assuming the honesty of the vendor, the vendor must return the card to the card issuing establishment, which establishment will thereafter return the card to its rightful owner. Under less favorable circumstances, the vendor or an employee, recognizing the inadvertent loss of the card by the owner, may take advantage of this fact to acquire goods or services for which the card holder will ultimately be liable.

When the card holder discovers his loss, an incident which may not occur until the next time the owner wishes to use the card, he will be put to the nuisance and expense of providing written notice of the loss, to limit his liability.

SUMMARY OF THE INVENTION

The present invention is broadly directed to a reminder carrier for credit cards. More particularly, the invention relates to a credit card carrier which may form a part of a wallet, purse or the like, which is normally three dimensional and hence relatively bulky, but which is rendered essentially two dimensional responsive to the insertion of a rigid credit card.

A further object of the invention is the provision of a wallet or the like incorporating one or more resilient and preferably transparent sleeves or envelopes which are normally curved or bent to a three dimensional configuration but are disposed in a flat or two dimensional configuration when a credit card is inserted therein, the sleeves or envelopes being disposed between the outer leaves of a wallet, whereby the wallet may not be readily closed and may not be inserted in the pocket or purse of the user unless the sleeves or envelopes are reduced to their two dimensional configuration by the insertion of the credit card.

A still further object of the invention is the provision of a device of the class described and including latch or detent means for physically preventing closing of the wallet or credit card carrier unless the credit card has been returned to the envelope or container from which it has been removed.

Still a further object of the invention is the provision of a credit card carrier or the like wherein the individual envelopes, in addition to preventing or limiting closure of the container, also function to prevent a credit card properly inserted in the envelope from accidentally falling clear of the envelope.

To attain these objects and such further objects as may appear herein or be hereinafter pointed out, reference is made to the accompanying drawings, forming a part hereof, in which:

FIGURES 1 and 2 are perspective views of a wallet incorporating the credit card carrier device, respectively in the credit card removed and credit card inserted positions;

FIGURES 3 and 4 are perspective views of a wallet incorporating another embodiment of the invention, respectively in the credit card removed and credit card inserted positions;

FIGURES 5 and 6 are perspective views of a wallet incorporating still a further embodiment of the invention, respectively in the credit card removed and credit card inserted positions.

Turning now to the drawings, 10 represents a wallet or the like comprising cover portions 11 and 12 which function in the usual manner to hold bills, identification and the like. The covers 11 and 12 are foldable in the usual manner between open and closed positions along the medial fold lines 13, 13.

In the embodiment of FIGURES 1 and 2, there is shown a card container means 14 which is optionally but preferably comprised of resilient, transparent plastic material. The plastic material is formed, as shown in FIGURE 1, to be disposed in a generally tubular conformation defining an open mouth portion 15. In the expanded position shown in FIGURE 1, it will be observed that the side walls 16, 17 defining the container 14 are spaced apart a considerable distance.

The container 14 is secured to the wallet 10 by any suitable means, such as adhesively or by a flap (not shown) hingedly secured to the base 18 of the wall 16, the flap being slipped or sleeved between the multiple folds defining the leaf 12 of the wallet. Optionally but preferably, the wall 17 adjacent the lowermost marginal edge 19 thereof is provided with a depending tab 20.

The leaf 12 incorporates a detent or latching slot 21 which, in the open position of the container 14 depicted in FIGURE 1, registers with the tab 20 so that the tab will extend into said slot.

When the parts are positioned as shown in FIGURE 1, it will be evident that it would be difficult or impossible to close the leaves 11, 12 to a normally folded position of the wallet, the closing being impeded by the three dimensional conformation of the container 14 and, in addition, by the presence of tab 20 in the latching slot 21.

However, when a credit card 22 which, as is well known, comprises a flat plate of relatively stiff plastic, metal or the like, is inserted through the mouth 15 of the container 14, the card will spread the side marginal edges 23, 24 of the normally tubular container 14, to define an essentially flat structure, as shown in FIGURE 2. In the course of the spreading movement aforesaid, the walls 16, 17 of the container will be distended and distorted to an essentially planar structure and at the same time the tab 20 will be cleared from the latching slot 21.

As will be evident from an inspection of FIGURE 2, the container 14, after insertion of the rigid card 22, will not resist the closing of the leaves 11, 12 of the wallet.

In FIGURES 3 and 4, wherein like parts have been given like reference numerals, the card container 14' comprises upper and lower walls 16', 17', likewise of transparent, resilient plastic, the walls 16', 17' being normally disposed in an arcuate conformation as shown.

In the embodiment of FIGURE 3, a lug 25 extends inwardly from the leaf 12' of the wall 10'. The parts will lie in the position shown in FIGURE 3 after removal of a credit card, whereupon it will be evident that closing of the wallet to the normal position in which it is carried in the pocket will be resisted both by the arcuate or three dimensional conformation of the holder 14' and the interaction of the lead edge 26 of the container with the upstanding lug 25.

However, when a card 22'—see FIGURE 4—is inserted between the walls 16', 17', said walls will be deflected from their normal arcuate configuration to an essentially flat or planar configuration, in which configuration they will offer substantially no resistance to closing of the wallet.

In the embodiment of FIGURES 5 and 6, wherein like parts have been given like reference numerals, the container 14" comprises a lower wall 17" which is provided with a cutout or aperture 27 which occupies a minor portion of the area of the wall. The wall 16", in the area coinciding with the aperture 27 in the wall 17", is provided with a flap 28 integrally formed with the wall 16", the flap 28 being connected to the wall 16" along a fold line 29. The flap 28, as shown, is deflected substantially at right angles to the wall 16" and extends through the cutout 27 of the wall 17".

It will thus be observed that closing of the wallet from the position shown in FIGURE 5 will be resisted by the flap displaced from the plane of the container 14". However, when a card 22" is inserted between the walls 16", 17", the card will act to prevent the flap 28 from extending outwardly through the cutout 27, whereupon, as shown in FIGURE 6, the container will present no obstacle to folding of the leaves 11", 12" of the wallet.

From the foregoing embodiments it will be evident that there is provided a credit card container structure which is essentially three dimensional where a credit card is not disposed within the container, but which is rendered essentially two dimensional responsive to insertion of a credit card.

All of the embodiments have the additional advantage of preventing the accidental or inadvertent displacement of the credit card, when the same is secured within the card receiver, or container. This function results from the pressures exerted against portions of the credit card by the card container, which container tends to revert to its normal, three dimensional configuration against the influence of the inserted card.

While the device is illustrated in conjunction with a wallet, it will be readily appreciated that the advantages of the card container are not limited in usage to wallets alone but that the same has independent utility.

While three embodiments have been illustrated, for purposes of compliance with the patent laws, it will be understood that this invention should be broadly construed and that still other and further modifications, including other forms of non-collapsing folds and bends in the card container, may be made, utilizing the principles of the invention without departing from the spirit thereof.

Also, while the devices illustrate the use of latching mechanisms to prevent folding the wallet halves in conjunction with the normal three dimensional configuration of the card container, it will be evident that either expedient alone will function in the desired manner to reduce the likelihood of credit card loss.

Having thus described the invention and illustrated its use, what is claimed as new and is desired to be secured by Letters Patent is:

1. A wallet or the like comprising first and second cover portions hingedly connected along a common margin for movement between a folded, generally parallel closed position and an open position, resilient credit card container means disposed between said covers, said card container means being normally stressed to three dimensional condition, thereby to block movement of said cover portions to said closed position, said card container means being shifted to a substantially planar condition responsive to the insertion therein of a flat, rigid element, such as a credit card.

2. A device in accordance with claim 1 wherein said container means comprises a resilient, transparent plastic enclosure having side portions disposed in non-planar configuration, said side portions being maintained in planar condition responsive to the reception in said enclosure of a flat, rigid element, such as a credit card.

3. A device in accordance with claim 2, including latch means on said container means, complemental detent means on one of said cover portions, said latch means and detent means being biased into engagement when said container means is in said three dimensional conformation, thereby to prevent said container means from shifting to said planar condition in the engaged position of said latch and detent means.

4. A device in accordance with claim 1 wherein said container means comprises a parallel pair of sheets of transparent, resilient plastic, one of said sheets including a cutout portion and the other said sheet having a tab portion extending through said cutout portion of said one sheet, said tab being retained in substantially coplanar alignment with said other sheet when a rigid, flat member, such as a credit card, is disposed between said sheets.

5. A wallet or the like comprising first and second cover portions shiftable between parallel closed position and open position, credit card container means disposed between said cover portions, means for expanding said container means, thus to prevent movement of said cover means from said open to said closed position, and means responsive to insertion of a rigid, flat member, such as a credit card, in said container means for collapsing said container means to an essentially planar condition, thus to permit movement of said cover portions to said closed position.

6. A wallet or the like comprising first and second cover portions hingedly connected along a common margin for movement between a folded, generally parallel closed position and an open position, credit card container means disposed between said cover portions, latch means operatively associated with said container means, complemental detent means on one of said cover portions, said latch means and detent means being normally biased into engagement, thereby to block movement of said cover portions from said open to said closed position, said latch and detent means being disengaged responsive to the insertion of a flat, rigid element, such as a credit card, within said container means.

References Cited

UNITED STATES PATENTS 1,582,492  4/1926  Tantlinger _____ 150—39
3,299,929  1/1967  Shagin et al. _____ 150—39
3,369,585  2/1968  Martinsen _____ 150—39

FOREIGN PATENTS 48,771  6/1911  Austria.

DONALD F. NORTON, *Primary Examiner.*